United States Patent Office 2,801,911
Patented Aug. 6, 1957

2,801,911

SUBSTITUTED-UREA SULFONIC ACID HERBICIDES

Everett E. Gilbert, Flushing, Julian A. Otto, Long Island City, and Silvio A. Pellerano, Brooklyn, N. Y., assignors to Allied Chemical & Dye Corporation, New York, N. Y., a corporation of New York No Drawing. Application March 23, 1954,
Serial No. 418,219

19 Claims. (Cl. 71—2.6)

This invention relates to herbicides and more particularly refers to new compounds and compositions and the use of such compounds and compositions as herbicides.

Substituted ureas having the general formula

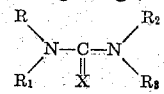

wherein R represents a cyclic hydrocarbon radical and its substitution products; $R_2$ represents an aliphatic hydrocarbon radical; X represents O or S; and $R_1$ and $R_3$ represent a group selected from the class consisting of a hydrogen radical and an aliphatic hydrocarbon radical; have been found to have good herbicidal activity.

The herbicidal substituted ureas are discussed and described in Patents 2,555,444-5-6-7 issued October 13, 1953, and 2,661,272 of December 1, 1953. Specific illustrative examples of these substituted ureas are phenyldimethylurea and chlorophenyldimethylurea. In the application of herbicides to a locus it is important that the herbicide be capable of formulation to permit convenient even distribution on the soil at a controlled rate because even minor variations in dosages have a marked effect on the plants. In view of the sensitivity of certain crops to variations in dosages of herbicides, it was found desirable that the herbicidal formulation be a true solution containing small amounts of toxicant and that the solvent be relatively inexpensive and readily available to the farmer. Substituted ureas such as chlorophenyldimethylurea and phenyldimethylurea are almost totally insoluble in common solvents such as xylene, fuel oil, aromatic solvents, diesel oil, petroleum fractions and water. Although the substituted ureas may be dissolved in powerful but expensive solvents such as dimethyl formamide or dimethyl acetamide, the application of such solutions as tersely expressed in Patent 2,661,272 is "uneconomical and generally impractical." The herbicides chlorophenyldimethylurea and phenyldimethylurea, have extremely low solubility in petroleum fractions and even concentrates, i. e. solutions of these ureas in an organic solvent, have impracticably low solubility in petroleum fractions.

An object of the present invention is to provide new compounds and compositions containing said compounds effective for use as herbicides.

Another object of the present invention is to provide herbicidal compounds which will form a true solution of the herbicide in inexpensive readily available solvents.

Another object of the present invention is to provide an economical, efficient method of controlling weeds by the application of new compounds and new compositions of matter.

Other objects and advantages of the present invention will be apparent from the following description.

We have found that compounds conforming to the general formula

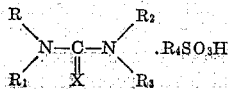

wherein R represents a cyclic hydrocarbon radical and its substitution products; $R_2$ represents an aliphatic hydrocarbon radical; X represents a group selected from the class consisting of O or S; $R_1$ and $R_3$ represent a group selected from the class consisting of a hydrogen radical and an aliphatic hydrocarbon radical; and $R_4$ represents a group selected from the class consisting of a cyclic hydrocarbon radical and an aliphatic hydrocarbon radical and their substitution products; have valuable herbicidal properties. The preferred compounds are those conforming to the above formula wherein R represents a cyclic group selected from the class consisting of phenyl, alkylphenyl, chlorophenyl, cyclohexyl, alkylcyclohexyl and chlorocyclohexyl radicals; $R_1$ represents a hydrogen radical; $R_2$ represents an aliphatic hydrocarbon having no more than six carbon atoms, preferably no more than three carbon atoms; $R_3$ represents a group selected from the class consisting of a hydrogen radical and an aliphatic hydrocarbon radical having no more than six carbon atoms, preferably no more than three carbon atoms; $R_4$ represents a group selected from the class consisting of an aliphatic hydrocarbon radical and a cyclic hydrocarbon radical, preferably a radical having more than five carbon atoms and their substitution products; and X represents an oxygen radical.

The compounds of the present invention may be prepared by reacting a substituted urea of the class having the general formula

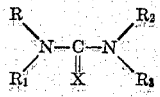

wherein R represents a cyclic hydrocarbon radical and its substitution products; $R_2$ represent san aliphatic hydrocarbon radical; X represents a group selected from the class consisting of O or S; $R_3$ represents a group selected from the class consisting of a hydrogen radical and an aliphatic hydrocarbon radical; with sulfonic acid, i. e. an organic compound containing the —$SO_3H$ radical. Examples of sulfonic acid are dodecyl benzenesulfonic acid; naphthalene-B-sulfonic acid; benzenesulfonic acid; p-toluenebenzene-sulfonic acid; ethanesulfonic acid; methanesulfonic acid; 2,4,6-trichlorobenzenesulfonic acid; diphenyl-p-p'disulfonic acid; esters of sulfophthalic anhydride; and mixtures of sulfonic acids.

The reaction may be readily accomplished by mixing the substituted urea and sulfonic acid preferably in the presence of a solvent such as xylene or acetone and then separating the reaction product by precipitation with a solvent such as petroleum ether. The reaction product is a new compound formed by the reaction of one mol of the substituted urea with one mol of sulfonic acid and, dependent upon the particular usbstituted urea and sulfonic acid employed, is a solid or liquid reaction product, its properties different from either the substituted urea or sulfonic acid reactants. For purposes of convenience, the new reaction products will be termed "sulfonic acid urea" compounds.

One property which makes the sulfonic acid urea compounds particularly useful in the formulation and application as a herbicide is the increased solubility of these compounds in aromatic hydrocarbons such as xylene, which is often used as a carrier or solvent for agricultural formulations. Compounds of the type 1-(phenyl)-3,3-dimethylurea and 1-(4-chlorophenyl)-3,3-dimethylurea have indicated excellent herbicidal properties. However, these compounds suffer from the serious objection of being only slightly soluble in organic solvents and water. This renders these compounds difficult to formulate as a liquid which fact has seriously impeded their application and use as practical agricultural chemicals. Solubility is especially low in aromatic hydrocarbons such as xylene. Thus, 1-(phenyl)-3,3-dimethylurea is soluble in xylene at 30° C. to the extent of only about 0.5% while 1 - (4 - chlorophenyl) - 3,3 - dimethylurea is soluble to even a lesser extent. Thus, when such substituted ureas are diluted with an inexpensive liquid carrier medium to form a liquid formulation, there is difficulty in preparing the mixture in evenly dispersed form, maintaining the substituted urea in dispersed form and applying the substituted urea at a uniform dosage to the soil. The problem of distributing uniform dosages of herbicide to the soil for agricultural purposes is particularly acute because low dosages are required and slight variations in dosages to the soil may destroy the crop or negative the effectiveness of the herbicide for weed killing or both. For example, in pre-emergence treatment the use of ½ pound acre per herbicide may effectively control weeds whereas more than 1–2 pounds herbicide may cause material damage to the crop. Based on practical experience the most effective method for applying consistently uniform dosages of herbicide to agricultural crops sensitive to such herbicides and requiring low dosages would be to apply a dilute true solution of the herbicide. Since the herbicidal ingredient employed in the solution for agricultural purposes, such as pre-emergence application, is a relatively small amount compared to the quantity of solvent—roughly 200 parts or more solvent are employed per part of herbicide—it is important that such solvent be low in cost and readily available to the farmer. A liquid hydrocarbon petroleum fraction, such as fuel oil, diesel oil, kerosene and naphtha, is an excellent material for use as a herbicidal solvent because it is readily available to the farmer, low in cost, non-corrosive, and has some herbicidal activity of its own. The herbicides, chlorophenyldimethylurea and phenyldimethylurea, have extremely low solubility in petroleum fractions and even concentrates, i. e., a solution of these ureas in an organic solvent, have impracticably low solubility in petroleum fractions. The sulfonic acid urea compounds of the present invention have much higher solubility in xylene and other similar aromatic solvents and in the presence of excess acid such solutions blend easily with petroleum fractions thus forming an inexpensive liquid formulation which can be conveniently and uniformly applied as a pre-emergence herbicide in dilute concentrations of ½–2 pounds sulfonic acid urea compounds per acre of soil.

The following examples illustrate preparation of the new sulfonic acid urea compounds of the present invention.

*Example 1*

A mixture of 60 parts by weight phenyldimethylurea, 120 parts by weight dodecylbenzene sulfonic acid (equimolecular quantities) and 72 parts by weight xylene was stirred for about two hours until a homogeneous liquid resulted. A slightly exothermal reaction was noted, resulting in a temperature increase of about 5° C. The final mixture weighed 252 parts, indicating no weight loss. Two one tenth aliquot portions of the mixture, 25.2 parts, were extracted with petroleum ether (30–65° C.) to remove the xylene and free dodecylbenzenesulfonic acid (phenyldimethylurea is not soluble in petroleum ether). A viscous liquid layer separated. The petroleum ether layer was decanted and the extraction repeated with 3 to 5 portions petroleum ether, each portion being about one-half the volume of the viscous liquid layer. The final residues were dried in a vacuum desiccator to yield 16 and 17 parts by weight of a viscous almost resinous material. Titration showed the two materials to contain 1.97 and 2.06 ml. equivalent acid per gram. Calculated for dodecylbenzene-sulfonic acid-phenyldimethylurea compound of 1:1 mol ratio is 2.02 ml. equivalent acid per gram. The formula for the product resulting from the reaction of dodecylbenzene-sulfonic acid and phenyldimethylurea corresponds to

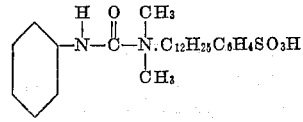

*Example 2*

(a) To 8.2 parts by weight phenyldimethylurea and 11.3 parts by weight naphthalene-B-sulfonic acid monohydrate (equimolar quantities) was added 4 parts by weight acetone and the mixture stirred and gently warmed on a steam bath (not over 50° C.) until a homogeneous liquid resulted. The acetone was stripped off in a vacuum desiccator. The residue, a sticky gel, was stirred 90 parts by weight of anhydrous ethyl ether, resulting in the formation of a fine white crystalline precipitate. After standing one hour this was collected on a filter and washed with anhydrous ether. The precipitate weighed 17.7 parts and melted at about 70–78° C. At 115° C. it decomposed. Titration showed the precipitate to contain 2.68 ml. equivalent acid per gram. Calculated for the anhydrous naphthalene-B-sulfonic acid-phenyldimethylurea compound of 1:1 mol ratio, the value is 2.69 ml. equivalent acid per gram. The reaction product had a completely different X-ray diffraction pattern than either naphthalene-B-sulfonic acid or phenyldimethylurea.

(b) When 1.64 parts by weight phenyldimethylurea, 2.26 parts by weight naphthalene-B-sulfonic acid (equimolar quantities) and 4 parts by weight xylene were stirred together a two-phased liquid mixture resulted. Washing with petroleum ether and drying in a vacuum desiccator yielded a stickly resinous solid at room temperature. When seeded with a few crystals of the product from (a) above, the material crystallized at room temperature.

The formula of the reaction product of (a) and (b) above is

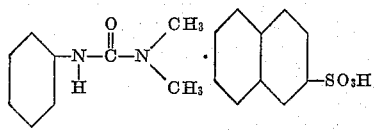

*Example 3*

16.4 parts by weight phenyldimethylurea, 19.4 parts benzenesulfonic acid monohydrate, and 22 parts by weight xylene were stirred together. A two-phased liquid system resulted. The upper xylene layer was decanted and the residue washed three times with petroleum ether and then dried in a vacuum desiccator. At room temperature it remained a mobile liquid. Cooled in ice it became very viscous. Cooled in Dry Ice it formed a glass-like, non-crystalline solid that could be pulverized. However, it melted below room temperature.

The formula of the reaction product is

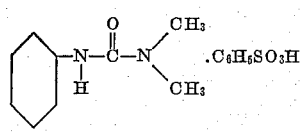

*Example 4*

8.2 parts by weight phenyldimethylurea, 9.5 parts by weight p-toluenesulfonic acid monohydrate, (equimolar quantities) and 18 parts by weight xylene gave a two-phased liquid system. Following the procedure of Example 3, there was obtained 17.5 parts by weight of a sticky liquid that formed a glass-like solid at Dry Ice temperatures. Under these conditions, it could be pulverized, but at higher temperatures it gradually became tacky and liquefied below room temperature.

The formula of the reaction product is

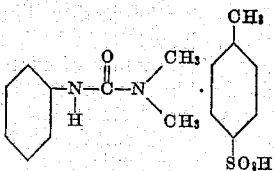

Example 5

4 parts by weight p-chlorophenyldimethylurea, 4.5 parts by weight naphthalene-B-sulfonic acid (equimolar quantities) and 4 parts by weight of acetone were stirred together with gentle heating until a homogenous solution resulted. About 100 parts of anhydrous ethyl ether was added resulting in the separation of a white precipitate. After standing one hour, the precipitate was collected on a filter and washed with ethyl ether. The product weighed 7.2 parts. When heated slowly it melted over a range of about 90–114° C.—when heated rapidly, at about 90–95° C. The X-ray diffraction pattern of the reaction product was different from that of p-chlorophenyldimethyl urea or naphthalene-B-sufonic acid. Titration showed the reaction product to contain 2.35 ml. equivalent acid per gram. Calculated for the hydrated naphthalene-B-sulfonic acid p-chlorodimethylurea compound of 1:1 mol ratio, the value is 2.36 ml. equivalent per gram. The formula of the reaction product is

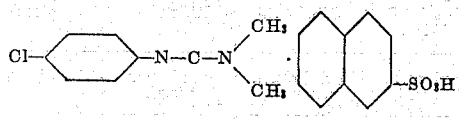

Example 6

4 parts by weight p-chlorophenyldimethylurea, 6.5 parts by weight dodecylbenzenesulfonic acid (equimolar quantities) and 10 parts by weight xylene when stirred together formed a homogeneous solution. When this was mixed with petroleum ether (about 150 parts by weight) a viscous liquid separated. Freed of solvent it weighed 10 parts.

The formula of the reaction product is

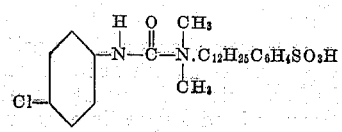

Example 7

4 parts by weight p-chlorophenyldimethylurea, 3.8 parts by weight p-toluenesulfonic acid monohydrate (equimolar quantities) and 10 parts by weight xylene were stirred together, resulting in the formation of a two-phase liquid system. The xylene was decanted from the viscous bottom layer and the residue washed several times with petroleum ether.

The formula of the reaction product is

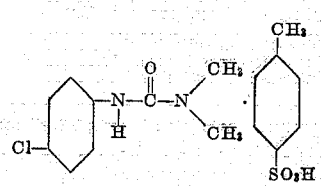

Example 8

4 parts by weight of p-chlorophenyldimethylurea, 2.2 parts by weight of ethanesulfonic acid (equimolar quantities) and 10 parts by weight xylene were stirred together. There was a slight heat of reaction on mixing and again a two-phased liquid system was formed. After removal of the xylene the residue was a viscous liquid.

The formula of the reaction product is

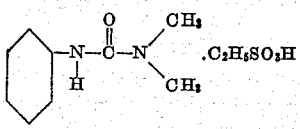

Example 9

1.5 parts by weight 1-phenyl-3-methylurea, 3.3 parts by weight dodecylbenzenesulfonic acid and 2 parts by weight xylene were stirred at room temperature until a homogeneous solution resulted. Petroleum ether was added to the mixture to extract the xylene and free dodecylbenzenesulfonic acid. The viscous oily layer that separated was washed twice more with petroleum ether after decanting the upper layer. Dried in a vacuum desiccator the tacky viscous liquid weighed 4.5 parts. Cooled in Dry Ice it formed a glass-like solid that could be pulverized. On warming, the solid became tacky and liquefied below room temperature.

The formula of the reaction product is

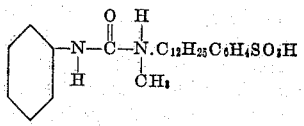

Example 10

Equimolar quantities of 1-phenyl-3,3-diethylurea and dodecylbenzenesulfonic acid processed as in Example 9 gave a similar tacky viscous liquid.

The formula of the reaction product is

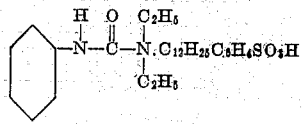

Example 11

1.9 parts by weight 1-phenyl-3,3-diethylurea, 2.3 parts by weight naphthalene-B-sulfonic acid monohydrate, and 2 parts by weight acetone were stirred together, readily forming a homogeneous liquid. The acetone was stripped off at reduced pressure, leaving a tacky viscous liquid weighing 4.1 parts. A glass-like solid formed at Dry Ice temperatures.

The formula of the reaction product is

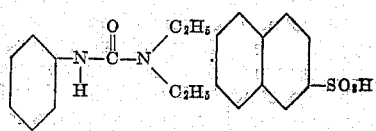

Example 12

Equimolar quantities of 1-phenyl-3-methylurea, and naphthalene-B-sulfonic acid processed as in Example 11 yielded a similar tacky viscous liquid. After stirring with anhydrous ethyl ether and letting stand several days, the material gradually crystallized.

The formula of the reaction product is

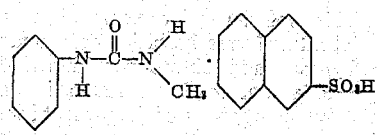

Example 13

3.28 parts by weight 1-phenyl-3,3-dimethylurea, 10.1 parts by weight of the sulfonic acid consisting of a sulfonated distillation residue from the manufacture of dodecylbenzene, and 9 parts by weight xylene were stirred together with gentle warming. All of the urea went into solution. Even after most of the xylene had been removed no urea precipitated. The residue was a tacky, viscous oil. When the oil was added to hexane the entire mixture dissolved and no phenyldimethylurea precipitated.

Example 14

1.5 parts by weight 1-phenyl-3-methylurea, and 1.9 parts by weight p-toluenesulfonic acid monohydrate were stirred together as dry solids. The mixture soon became tacky and with continued stirring formed a homogeneous tacky liquid. Cooled in Dry Ice, it formed a glass-like solid but did not crystallize.

The formula of the reaction product is

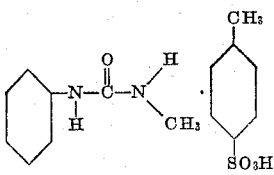

Tests demonstrate the reaction products of sulfonic acid with the substituted urea to be distinct compounds. The sulfonic acid urea compounds have characteristic X-ray diffraction patterns different from the individual reactants forming the compound. This is absolute proof that a new compound is formed as opposed to a mere mixture. The sulfonic acid and substituted urea reactants react in a one to one molar ratio to form the new compound which is not changed by extraction with a solvent in which the individual constitutent is soluble. The new sulfonic acid urea compounds have different physical properties than the individual reactants forming such compounds particularly with respect to high solubility of sulfonic acid urea compounds in certain solvents as contrasted with the starting ureas.

Because of the high potency of the sulfonic acid urea compounds and for purposes of marketing and of application, it is usually desirable to admix the sulfonic acid urea compounds with other materials. These formulations may take four forms: wettable powder, dust, emulsive concentrate, and solution. The preferred formulation is a solution wherein the liquid carrier is a cheap, readily available material as for example hydrocarbon oil or water. Substituted urea herbicide compounds such as phenyldimethylurea and chlorophenyldimethylurea are not readily soluble in aromatic solvents or in water. The sulfonic acid urea compounds of the present invention are more soluble in aromatic solvents and many are miscible in all proportions in common aromatic solvents such as benzene, toluene, ethyl benzene, xylene and oils containing a high percentage of aromatic hydrocarbons sold commercially under the trade names "HiSolv 473" and "Velsicol AR 50G." Solutions containing the sulfonic acid urea compound are stable, i. e., contrary to the behavior of simple solutions, the sulfonic acid urea compound does not crystallize from solution upon cooling—a definite advantage of any practical formulation. Perhaps even more important solutions of the sulfonic acid urea compounds in aromatic solvents can be further diluted with inexpensive hydrocarbon oil such as fuel oil, diesel oil, kerosene or naptha. In the presence of excess sulfonic acid the solutions may be diluted to any desired degree with these cheap solvents without separation of insoluble material. Indeed, solutions of certain of the sulfonic acid urea compound in an aromatic solvent admixed with excess sulfonic acid may be diluted with water instead of hydrocarbon oil without separation of insoluble material due to the fact that the sulfonic acid urea compounds have appreciable solubility in water as contrasted to substituted ureas which have negligible solubility in water. The addition of excess sulfonic acid to formulations containing a sulfonic acid urea compound has the further advantage of inhibiting dissociation or decomposition of the sulfonic acid urea compound when exposed to high temperatures for long periods of time.

In Table I below are presented examples of formulations employing different solvents and the properties of such solvents particularly with respect to their miscibility with inexpensive diluents. All the formulations contain one pound per gallon phenyldimethylurea-dodecylbenzenesulfonic acid, the remainder being aromatic solvent and dodecylbenzenesulfonic acid.

TABLE I

| Solvent | Xylene | Velsicol AR 50G | HiSolv 473 | HiSolv 470 | Socal #2 |
|---|---|---|---|---|---|
| Appearance | Dark brown, thin. | Dark brown, viscous. | Dark brown, viscous. | Dark brown, viscous. | Dark brown, thin. |
| Specific Gravity (80° F.) | 0.971 | 1.016 | 0.997 | 0.983 | 0.967. |
| Lbs. per Gallon | 8.1 | 8.5 | 8.3 | 8.2 | 8.1. |
| Lbs. Solvent per Gallon | 3.1 | 3.5 | 3.3 | 3.2 | 3.1. |
| Flash Point, Tag, ° F | 90 | 216 | 192 | 182 | 97. |
| Freezing Characteristics | No precipitate at minus 12° C. in ½ hour. Solution more viscous but fluid. | No precipitate at minus 12° C. in ½ hour. Becomes non-fluid. Fluidity restored in 1 hour at 25° C. | | No precipitate at minus 12° C. in ½ hour. | No precipitate at minus 12° C. in ½ hour. Soluution more viscous but fluid. |
| Solvent Tolerance | All formulations miscible in all proportions with: kerosene; #2 fuel oil; diesel oil; Picco 501; and all 5 formulation solvents. | | | | |
| Water Tolerance | 10 cc. of all formulations with 100 cc. water gave clear solutions or emulsions depositing no crystals in 48 hours. | | | | |
| Heat Stability | Stable at room temperature; stable at least 6 hours at 50-60° C.; some decomposition at 90° C. | | | | |

Greenhouse tests have shown sulfonic acid urea compounds have substantially the same effectiveness on weeds when using half the weight of the urea material which is an important economic advantage since the sulfonic acids are appreciably lower in cost. Also the sulfonic acid urea compounds are less toxic to crops than the urea material alone which is an important agricultural advantage. The following table illustrates these differences.

| Formulation [2] | Toxicity Averages [1] | |
|---|---|---|
| | Crops | Weeds |
| Phenyldimethylurea-(80% Wettable Powder) | 7.6 | 9.6 |
| Phenyldimethylurea-Dodecylbenzenesulfonic acid | 4.3 | 9.3 |
| Phenyldimethylurea-Benzenesulfonic acid | 5.6 | 9.6 |
| Phenyldimethylurea-Methanesulfonic acid | 7.0 | 9.6 |
| Phenyldimethylurea-Toluenesulfonic acid | 5.6 | 9.0 |

[1] Based on injury rating as follows: 0, none; 1-3, slight; 4-6, moderate; 7-9, severe; 10, all killed.
[2] Wettable powder applied at 8 pounds per acre urea material on a 100% basis. Sulfonic acid urea compounds in all cases comprise 4 pounds urea material and 4 pounds sulfonic acid material.

The pure sulfonic acids alone (not urea) give no crop or weed injury up to 64 pounds per acre.

Although certain preferred embodiments of the invention have been disclosed for purpose of illustration it will be evident that various changes and modifications may be made therein without departing from the scope and spirit of the invention.

We claim:

1. A compound suitable for use as a herbicide having the formula

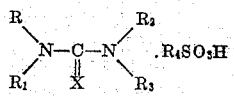

wherein R represents a group selected from the class consisting of a cyclic hydrocarbon radical, an alkyl substituted cyclic hydrocarbon radical, an aryl substituted cyclic hydrocarbon radical and their halogen substitution products; $R_2$ represents an aliphatic hydrocarbon radical; X represents a group selected from the class consisting of O and S; $R_1$ and $R_3$ represent a group selected from the class consisting of a hydrogen radical and an aliphatic hydrocarbon radical; and $R_4SO_3H$ represents a sulfonic acid selected from the group consisting of dodecyl benzenesulfonic acid, naphthalene-B-sulfonic acid, benzenesulfonic acid, p-toluene-benzenesulfonic acid, ethanesulfonic acid, methanesulfonic acid, 2,4,6-trichlorobenzenesulfonic acid, and diphenyl-p-p'disulfonic acid.

2. A compound suitable for use as a herbicide having the formula

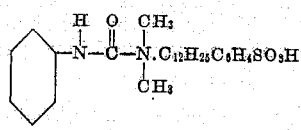

3. A compound suitable for use as a herbicide having the formula

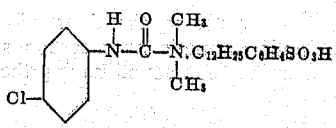

4. A compound suitable for use as a herbicide having the formula

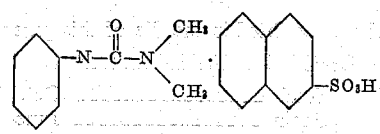

5. A compound suitable for use as a herbicide having the formula

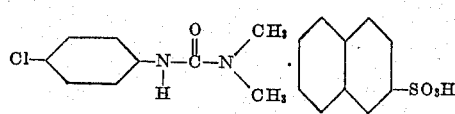

6. A compound suitable for use as a herbicide having the formula

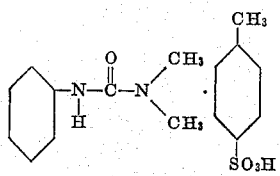

7. A method for controlling the growth of weeds which comprises applying to an area on which weed growth is to be retarded in an amount sufficient to exert a herbicidal action a compound having the formula

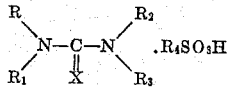

wherein R represents a group selected from the class consisting of a cyclic hydrocarbon radical, an alkyl substituted cyclic hydrocarbon radical, an aryl substituted cyclic hydrocarbon radical and their halogen substitution products; $R_2$ represents an aliphatic hydrocarbon radical; X represents a group selected from the class consisting of O and S; $R_1$ and $R_3$ represent a group selected from the class consisting of a hydrogen radical and an aliphatic hydrocarbon radical; and $R_4SO_3H$ represents a sulfonic acid selected from the group consisting of dodecyl benzenesulfonic acid, naphthalene-B-sulfonic acid, benzenesulfonic acid, p-toluene-benzenesulfonic acid, ethanesulfonic acid, methanesulfonic acid, 2,4,6-trichlorobenzenesulfonic acid, and diphenyl-p-p'disulfonic acid.

8. A method for controlling the growth of weeds which comprises applying to an area on which weed growth is to be retarded in an amount sufficient to exert a herbicidal action a compound having the formula

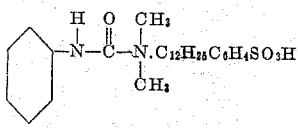

9. A method for controlling the growth of weeds which comprises applying to an area on which weed growth is to be retarded in an amount sufficient to exert a herbicidal action a compound having the formula

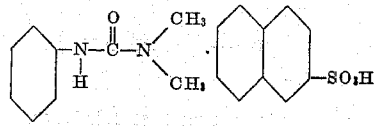

10. A method for controlling the growth of weeds which comprises applying to an area on which weed growth is to be retarded in an amount sufficient to exert a herbicidal action a compound having the formula

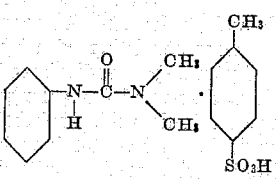

11. A solution for use in the destruction and prevention of weeds comprising a liquid aromatic hydrocarbon solvent having dissolved therein a compound having the formula

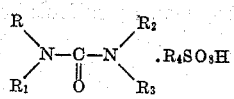

wherein R represents a group selected from the class consisting of a cyclic hydrocarbon radical, an alkyl substituted cyclic hydrocarbon radical, an aryl substituted cyclic hydrocarbon radical and their halogen substitution products; $R_2$ represents an aliphatic hydrocarbon radical; X represents a group selected from the class consisting of O and S; $R_1$ and $R_3$ represent a group selected from the class consisting of a hydrogen radical and an aliphatic hydrocarbon radical; and $R_4SO_3H$ represents a sulfonic acid selected from the group consisting of dodecyl benzenesulfonic acid, naphthalene-B-sulfonic acid, benzenesulfonic acid, p-toluene-benzenesulfonic acid, ethanesulfonic acid, methanesulfonic acid, 2,4,6-trichlorobenzenesulfonic acid, and diphenyl-p-d'disulfonic acid.

12. A solution for use in the destruction and prevention of weeds comprising a liquid aromatic hydrocarbon solvent having dissolved therein a compound having the formula

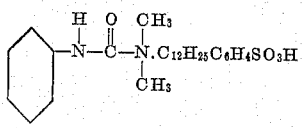

13. A solution for use in the destruction and prevention of weeds comprising a liquid aromatic hydrocarbon solvent having dissolved therein a compound having the formula

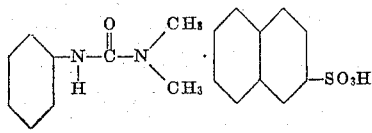

14. A solution for use in the destruction and prevention of weeds comprising a liquid aromatic hydrocarbon solvent having dissolved therein a compound having the formula

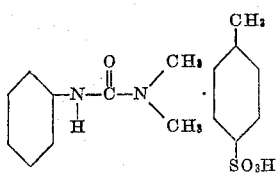

15. A solution containing a liquid aromatic hydrocarbon as a solvent and as a solute a compound having the formula

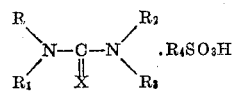

wherein R represents a group selected from the class consisting of a cyclic hydrocarbon radical, an alkyl substituted cyclic hydrocarbon radical, an aryl substituted cyclic hydrocarbon radical and their halogen substitution products; $R_2$ represents an aliphatic hydrocarbon radical; X represents a group selected from the class consisting of O and S; $R_1$ and $R_3$ represent a group selected from the class consisting of a hydrogen radical and an aliphatic hydrocarbon radical; and $R_4SO_3H$ represents a sulfonic acid selected from the group consisting of dodecyl benzenesulfonic acid, naphthalene-B-sulfonic acid, benzenesulfonic acid, p-toluenebenzenesulfonic acid, ethanesulfonic acid, methanesulfonic acid, 2,4,6-trichlorobenzenesulfonic acid, and diphenyl-p-p'-disulfonic acid; and a compound having the formula $$R_4SO_3H$$

wherein $R_4SO_3H$ represents a sulfonic acid selected from the group consisting of dodecyl benzenesulfonic acid, naphthalene-B-sulfonic acid, benzenesulfonic acid, p-toluenebenzenesulfonic acid, ethanesulfonic acid, methanesulfonic acid, 2,4,6-trichlorobenzenesulfonic acid, and diphenyl-p-p'disulfonic acid.

16. A method for controlling the growth of weeds which comprises applying to an area on which weed growth is to be retarded in an amount sufficient to exert a herbicidal action a compound having the formula

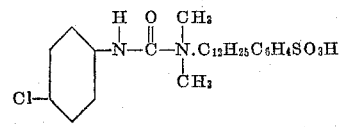

17. A method for controlling the growth of weeds which comprises applying to an area on which weed growth is to be retarded in an amount sufficient to exert a herbicidal action a compound having the formula

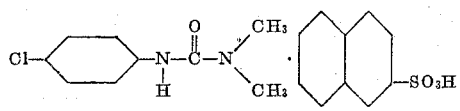

18. A solution for use in the destruction of weeds comprising a liquid aromatic hydrocarbon solvent having dissolved therein a compound having the formula

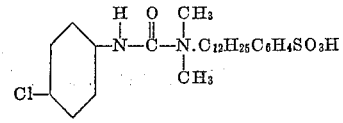

19. A solution for use in the destruction of weeds comprising a liquid aromatic hydrocarbon solvent having dissolved therein a compound having the formula

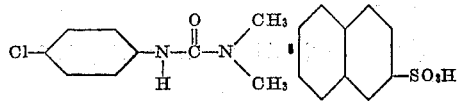

References Cited in the file of this patent
UNITED STATES PATENTS

| | | |
|---|---|---|
| 2,655,447 | Todd | Oct. 13, 1953 |
| 2,681,332 | Gorin | June 15, 1954 |
| 2,681,333 | Gorin | June 15, 1954 |